United States Patent [19]

Hiraiwa

[11] Patent Number: 4,475,857
[45] Date of Patent: Oct. 9, 1984

[54] DETENT APPARATUS
[75] Inventor: Syozo Hiraiwa, Higashi-Matsuyama, Japan
[73] Assignee: Diesel Kiki Company, Ltd., Tokyo, Japan
[21] Appl. No.: 346,676
[22] Filed: Feb. 8, 1982
[30] Foreign Application Priority Data
  Feb. 18, 1981 [JP] Japan ............... 56-20522
[51] Int. Cl.³ .............................. F16B 39/10
[52] U.S. Cl. ..................... 411/88; 411/101; 411/132
[58] Field of Search ............ 411/101, 88, 90, 89, 411/132, 154, 169, 208, 217, 83, 87, 98, 100, 132, 133, 134, 135

[56] References Cited
U.S. PATENT DOCUMENTS

| 181,419 | 8/1876 | Deshon | 411/101 |
| 305,793 | 9/1884 | Clark | 411/98 |
| 394,629 | 12/1888 | Wilkin | 411/101 |
| 406,953 | 7/1889 | Perry | 411/90 |
| 907,083 | 12/1908 | McHenry | 411/87 |

FOREIGN PATENT DOCUMENTS

| 287868 | 11/1928 | United Kingdom | 411/88 |
| 473545 | 10/1937 | United Kingdom | 411/83 |

Primary Examiner—Thomas J. Holko
Assistant Examiner—Adrian Whitcomb
Attorney, Agent, or Firm—Jordan and Hamburg

[57] ABSTRACT

A detent apparatus for preventing the rotation of delivery valve holders threaded into the body of a fuel injection pump comprises a generally rectangular flat plate which is formed with substantially semicircular notches at its opposite edges for receiving adjacent ones of the delivery valve holders, respectively. A bolt is threaded into a central opening of the flat plate to abut against the top of the pump body with such a force that the flat plate is raised into pressing contact with the undersides of enlarged head sections of the delivery valve holders, thereby ensuring firm frictional engagement between the delivery valve holders and the pump body into which the delivery valve holders are threaded.

2 Claims, 5 Drawing Figures

DETENT APPARATUS

BACKGROUND OF THE INVENTION

The present invention relates to a detent apparatus for preventing the rotation of neighboring identical elements which are threaded into their associated body. Typically, the neighboring identical elements may be delivery valve holders which are threaded into the body of a fuel injection pump of a Diesel engine.

A fuel injection pump compresses fuel with its plunger and delivers the pressurized fuel at a predetermined timing and by a predetermined amount through delivery valves which are associated with respective engine cylinders. The fuel is fed under pressure through fuel injection tubings to fuel injectors mounted on the engine cylinders and injected into the engine cylinders forcing the fuel injectors to open.

A delivery valve holder is threaded into the body of the fuel injection pump to retain a delivery valve airtight within the pump body through a gasket, which is interposed between the inner end of the valve holder and a delivery valve housing. A delivery pipe is connected to the outer end of the valve holder by a cap nut so that it can be removed from the valve holder as is required for the replacement of the fuel injector, for example. While the cap nut is unfastened, it is necessary to prevent the valve holder from being rotated therewith and thereby loosened. If the valve holder is loosened, the air-tight sealing between the valve holder and the valve housing provided by the gasket will be deteriorated to affect the pressure and amount of fuel injection which in turns affects the engine output. Re-fastening the valve holder would little aid in regaining the original air-tight sealing.

A conventional detent arrangement designed to keep the delivery valve holders from rotation comprises a pair of wedge members which are applied to adjacent valve holders from opposite sides of the latter and fastened together by a bolt and nut assembly. The valve holders are thus held in frictional engagement with the wedge members and thereby prevented from rotation. However, an intricate procedure is necessary for connecting the wedge members together by a bolt and nut assembly while bringing them closer to each other. The intricacy makes it difficult to promote automatic operation which is desired for the assembly of such detent arrangements.

SUMMARY OF THE INVENTION

A detent apparatus for preventing rotation of a plurality of neighboring identical elements each having a shank threaded into a body, an enlarged head with which a tool is engagable for driving the element into or out of the body and an annular surface defined between the shank and the head embodying the present invention, comprises an abutment member formed with notches complementary in shape to the annular surfaces of the neighboring elements to engage the annular surfaces of the elements along the edges of the respective notches thereof, and means for urging the abutment member upwardly into pressing contact with the undersides of the enlarged heads of the respective neighboring elements, so that an upward force is imparted axially to each of the neighboring elements to cause firm frictional engagement between the shank of the element and the body into which the shank is threaded.

In accordance with the present invention, a detent apparatus for preventing the rotation of delivery valve holders threaded into the body of a fuel injection pump comprises a generally rectangular flat plate which is formed with substantially semicircular notches at its opposite edges for receiving adjacent ones of the delivery valve holders, respectively. A bolt is threaded into a central opening of the flat plate to abut against the top of the pump body with such a force that the flat plate is raised into upwardly pressing contact with the undersides of enlarged head sections of the delivery valve holders, thereby ensuring firm frictional engagement between the delivery valve holders and the pump body into which the delivery valve holders are threaded.

It is an object of the present invention to provide a detent apparatus which has a minimized number of component parts which facilitates automatic assembly of the apparatus.

It is another object of the present invention to provide the detent apparatus which is particularly suited for preventing rotation of delivery valve holders threaded into the body of a fuel injection pump of a Diesel engine.

It is another object of the present invention to provide a generally improved detent apparatus.

Other objects, together with the foregoing, are attained in the embodiment described in the following description and illustrated in the accompanying drawings.

DESCRIPTION OF THE PREFERRED EMBODIMENT

While the detent apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
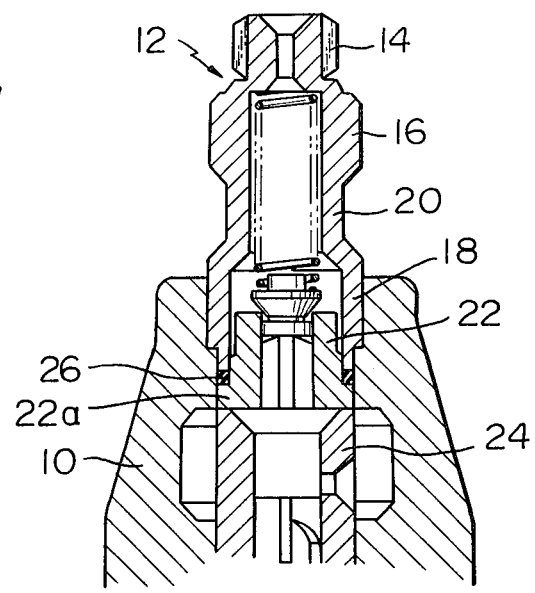
FIG. 1 is a vertical section of a delivery valve holder and the body of a fuel injection pump into which the delivery valve holder is threaded.

Referring to FIG. 1 of the drawings, a fuel injection pump of a Diesel engine comprises a body 10 having a threaded hole in which a delivery valve holder 12 is engaged. As well known in the art, the delivery valve holder 12 has a threaded upper end 14 to which a fuel injection tubing is connected by a cap nut, an enlarged hexagonal head section 16 with which a tool is engagable for driving the valve holder relative to the pump body 10, a threaded shank section 18 engaged in the pump body 10 and an annular surface 20 defined between the head 16 and the shank 18. A delivery valve housing 22 positioned within the pump body 10 is formed with a radially outward flange 22a which is pressed down by the valve holder 12 against the upper end of a plunger barrel 24 through a gasket 26.

Figure 2:
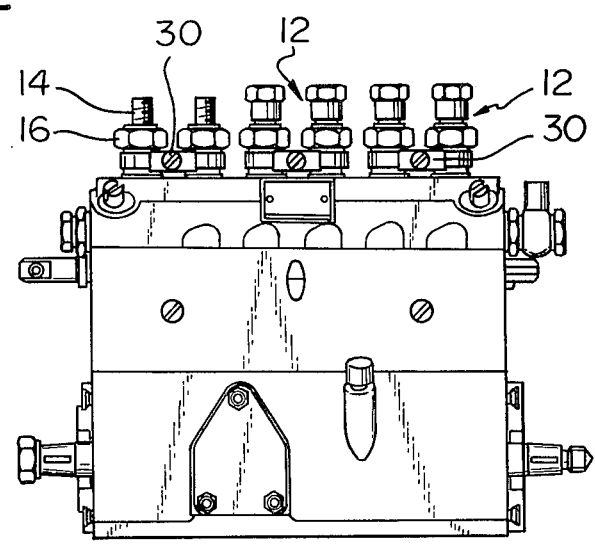
FIG. 2 is a side elevation of the fuel injection pump equipped with a set of conventional detent apparatus for the delivery valve holders.
Figure 3:
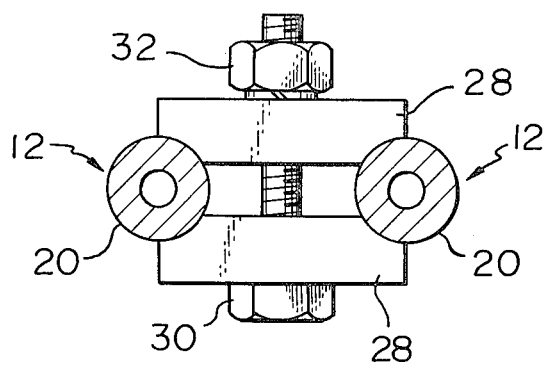
FIG. 3 is an enlarged plan view of the conventional detent apparatus.

Referring to FIGS. 2 and 3, there is shown a prior art detent apparatus for keeping adjacent delivery valve holders 12 from being loosened when the fuel injection tubings are removed from the upper ends 14 of the valve holders. As shown, the detent apparatus comprises a pair of wedge members 28 which are applied to the valve holders 12 from opposite sides and fastened together by a bolt 30 and a nut 32. With this arrangement, the wedge members 28 are held in frictional engagement with the annular recesses 20 of the valve holders 12 to keep them from rotation. However, such a prior art detent apparatus is undesirable for automatic assembly as previously discussed.

Figure 4:
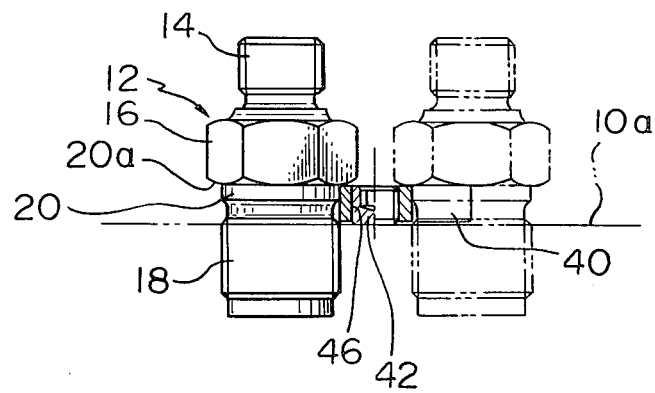
FIG. 4 is a partly sectional side elevation of a detent apparatus embodying the present invention which is interposed between neighboring delivery valve holders.
Figure 5:
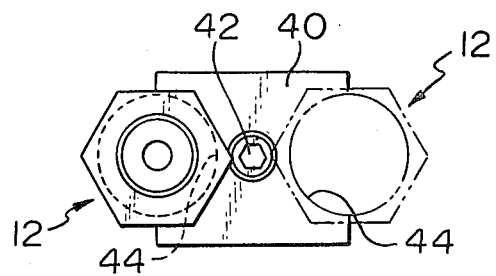
FIG. 5 is a plan view of the detent apparatus shown in FIG. 4.

Referring now to FIGS. 4 and 5, the detent apparatus of the present invention is constituted only by two members which are a generally rectangular relatively thick plate 40 and a bolt 42. The plate 40 is formed with substantially semicircular notches 44 at its opposite edges and a threaded hole 46 at its center for receiving the bolt 42.

In assembly, a plate 40 having the above structure is placed between adjacent delivery valve holders 12 before the latter is mounted to the pump body 10; the semicircular notches 44 are respectively engaged in the annular surfaces 20 of the valve holders 12. Then, a tool is engaged with the hexagonal head 16 of each valve holder 12 to fasten the valve holder 12 to the pump body 10 with a prescribed torque. In this situation, the bolt 42 is threaded into the hole 46 of the plate 40 until it strongly abuts against the top wall 10a of the pump body 10 as seen in FIG. 4. This causes the plate 40 to be raised clear of the top wall 10a of the pump body into firm contact with a shoulder 20a between the annular surface 20 and the hexagonal head 16 of each valve holder 12. As a result, an axially upward force is imparted to the valve holder 12 to maintain the threaded shank 18 of the valve holder 12 in intense frictional engagement with the threaded hole of the pump housing 12, thereby preventing the valve holder 12 from being loosened by an unexpected load.

Considering the relatively narrow space avialable for attaching the detent apparatus, it is preferable that the head of each bolt 42 be formed with a hexagonal recess in which a known hexagonal elongate tool for fastening the bolt 42 is engagable.

In summary, it will be seen that the present invention provides a detent apparatus which is simple in construction, incostly and can be readily assembled in an automatic assembly line.

Various modifications will become possible for those skilled in the art after receiving the teachings of the present disclosure without departing from the scope thereof.

What is claimed is:

1. An apparatus for preventing rotation of a plurality of neighboring delivery valve holders each having a shank threaded into a fuel injection pump, an enlarged head with which a tool is engagable for driving the delivery valve holder into or out of the fuel injection pump and an annular surface defined between the shank and the head, comprising:

an abutment member including a generally rectangular, relatively thick flat plate with notches each having a substantially semicircular shape to be complementary in shape to the valve holder, said abutment member being arranged between the neighboring delivery valve holders to engage the annular surfaces of the delivery valve holders along the edges of the respective notches, and means for urging the abutment member upwardly into pressing contact with the undersides of the enlarged heads of the respective neighboring delivery valve holders, said urging means including a bolt which is threaded into a threaded central opening of the abutment member to strongly abut against the top of the fuel injection pump until the abutment member is raised into pressing contact with undersides of the enlarged heads of the neighboring delivery valve holders, said bolt having a polygonal recess at a head thereof for receiving an elongated fastening tool, so that an upward force is imparted axially to each of the neighboring delivery valve holders to cause firm frictional engagement between the shank and the injection pump into which the shank is threaded.

2. An apparatus for preventing rotation of adjacent two delivery valve holders attached to a duel injection pump, each delivery valve holder having a shank threaded into the fuel injection pump, an enlarged head adapted to receive a tool for rotating the valve holder relative to the fuel injection pump, and an annular surface between the shank and the head, said annular surface, when the delivery valve holder is firmly fastened and threaded into the fuel imjection pump, being located above the fuel injection pump, comprising an abutment member including a rectangular flat plate having a thickness less than a space between the enlarged head and the surface of the fuel injection pump when the delivery valve holder is firmly attached to the fuel injection pump, semicircular notches situated at longitudinal ends of the plate, said semicircular notches being engaged with the adjacent annular surfaces of the delivery valve holders, and a threaded opening situated in the center of the flat plate, and means for urging the abutment member upwardly relative to the fuel injection pump, said urging means including a threaded bolt engaging the threaded opening of the abutment member and a polygonal recess at an upper end thereof adapted to receive a tool for rotating the bolt so that when the bolt is turned, the abutment member between the two delivery valve holders which are firmly attached to the fuel injection pump is pushed upwardly against the fuel injection pump to thereby impart firm frictional engagement between the delivery valve holders and the fuel injection pump.

* * * * *